Nov. 11, 1969   M. KUTS   3,477,134
HOSE TESTING APPARATUS
Filed Sept. 13, 1966   3 Sheets-Sheet 1

INVENTOR.
MATHEW KUTS
BY Joseph Januszkiewicz
ATTY.

Nov. 11, 1969   M. KUTS   3,477,134
HOSE TESTING APPARATUS
Filed Sept. 13, 1966   3 Sheets-Sheet 2

INVENTOR.
MATHEW KUTS
BY Joseph Januszkiewicz
ATTY.

Nov. 11, 1969  M. KUTS  3,477,134
HOSE TESTING APPARATUS
Filed Sept. 13, 1966  3 Sheets-Sheet 3
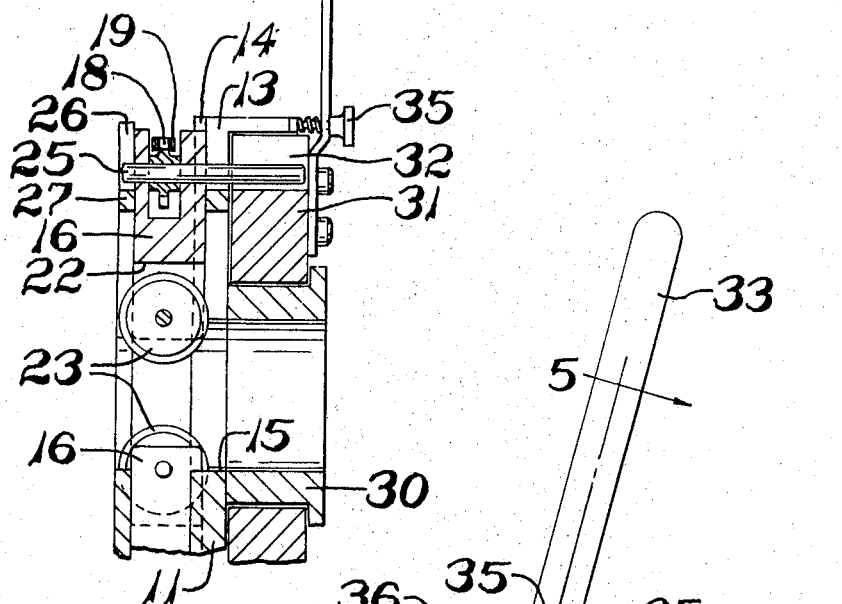
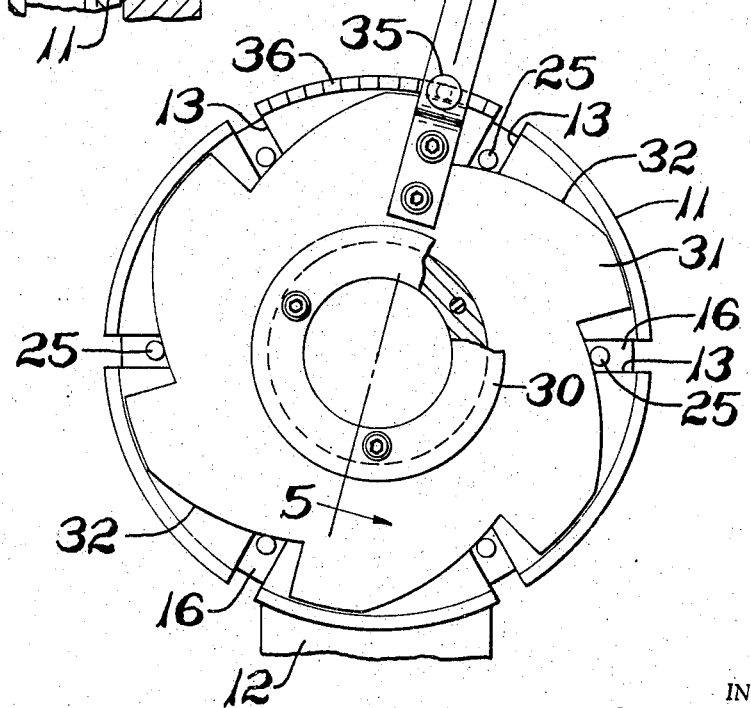
INVENTOR.
MATHEW KUTS
BY Joseph Januszkiewicz
ATTY.

United States Patent Office 3,477,134
Patented Nov. 11, 1969

3,477,134
HOSE TESTING APPARATUS
Mathew Kuts, Akron, Ohio, assignor to The B. F. Goodrich Company, New York, N.Y., a corporation of New York
Filed Sept. 13, 1966, Ser. No. 579,123
Int. Cl. G01b 5/20
U.S. Cl. 33—174                                  9 Claims

ABSTRACT OF THE DISCLOSURE

A hose testing method and apparatus wherein a plurality of circumferentialy spaced gauging elements cooperate to gauge the complete annular surface and cross sectional composite area wherein the individual outputs of the gauging element are interconnected to provide an output signal that is the summation of all the gauging elements.

---

This invention relates to a testing apparatus and method, and more particularly to a novel method and apparatus for testing the acceptability of a hose in its ability to convey fluids therethrough.

Heretofore, in the manufacture of garden hose or hose of the type for the conveyance of fluids, it has been the practice to random test the diameters of the hose at different locations along its length for out of roundness manually by calipers, micrometers or with go and no-go gauges. However, such procedure was slow and often failed to properly and accurately measure acceptability of hose since there was not a continuous measuring along the full length thereof. Such apparatus and method was limited to a sampling method which was relatively slow, inaccurate, and cumbersome. The general purpose of this invention is to provide an apparatus which accurately and rapidly and continuously measures the acceptability of a hose on a production line basis which minimizes the manual operation thereof thereby increasing the productivity of the testing operation. Furthermore, the present invention assures that a relatively unskilled operator may be used to perform the testing function. The present invention recognizes that in the measuring of acceptability of hose for the conveyance of fluids, it is the consistency of cross sectional area which is important and not necessarily the roundness of a hose. Even though the area of a certain section is oblong, its acceptability is unimpaired if its area of conveyance is equal to that of an adjoining round cross sectional area. Accordingly, the present invention provides a testing apparatus which fulfills this need.

The present invention contemplates the use of a plurality of circumferentially spaced gauging elements which contact the annular surface of the object to be tested, with each gauge element movable in a radial direction being operatively interconnected with each other to provide an output which is the summation of the individual displacements of the separate gauging elements. Such output is adjustable and connected to a device which automatically indicates acceptability or non-acceptability.

An object of this invention is to provide a new and improved apparatus for testing the acceptability of a hose to convey fluids.

A further object of this invention is to provide a new and improved method for testing the cross-sectional dimensions of a hose.

Another object of this invention is to provide a new method and improved testing device adapted to give accurate measurements irrespective of the out of roundness of the article.

A further object of this invention is to provide a novel method and testing apparatus which measures accurately the consistency of cross sectional area of a continuously moving hose.

These and other objects achieved by this invention will become apparent as this description proceeds in connection with the accompanying drawings.

FIG. 5 is a cross sectional view of the gauging means taken along line 5—5 of FIG. 6.

FIG. 6 is a rear elevational view of the gauging means showing the cam plate limiting the inward movement of the slide blocks.

Figure 1:
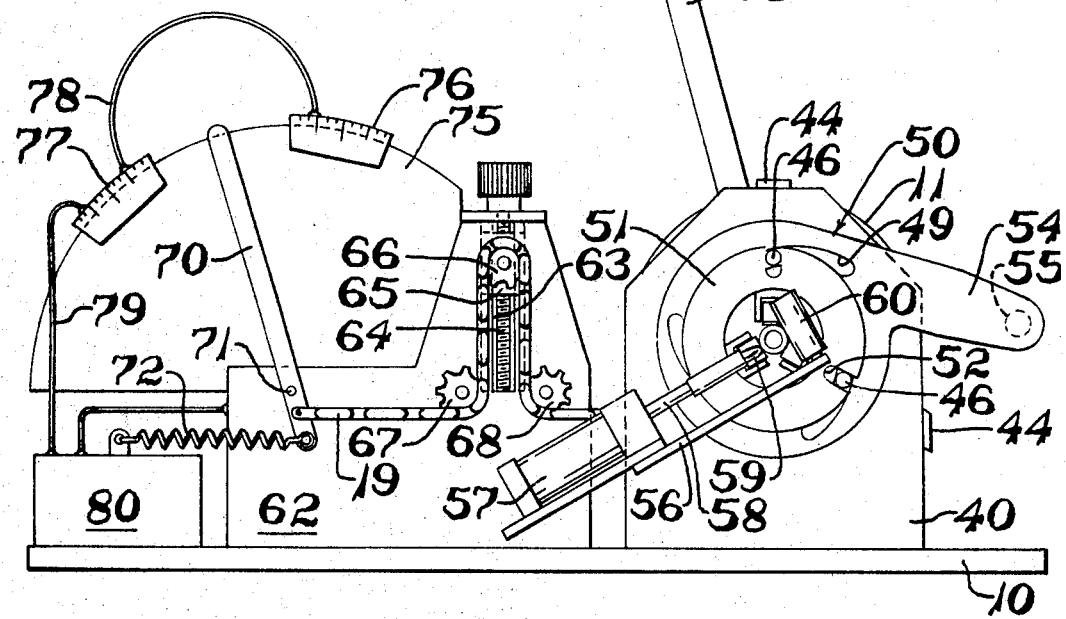
FIG. 1 is a front elevational view of the testing apparatus.
Figure 2:
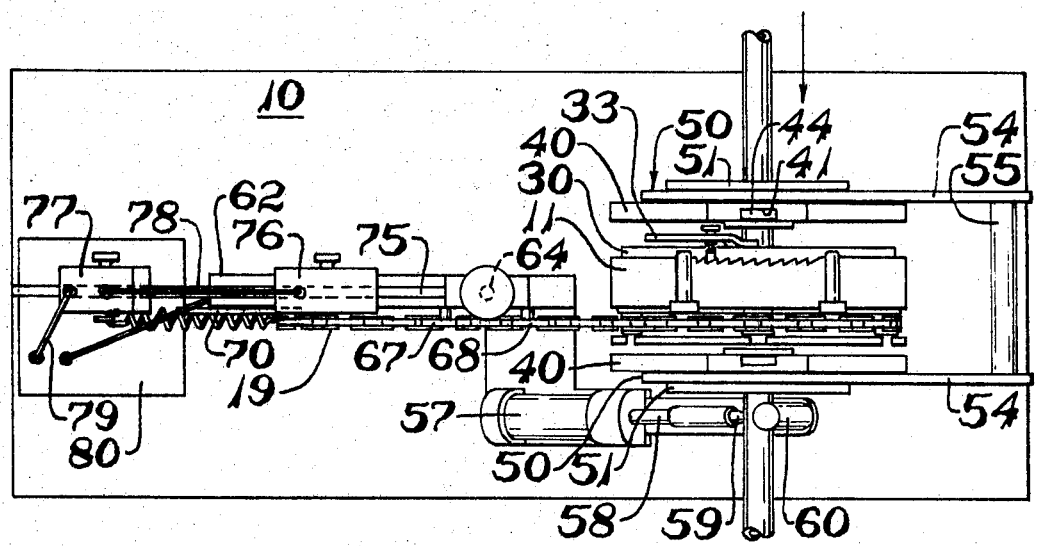
FIG. 2 is a plan view of the testing apparatus shown in FIG. 1.
Figure 4:
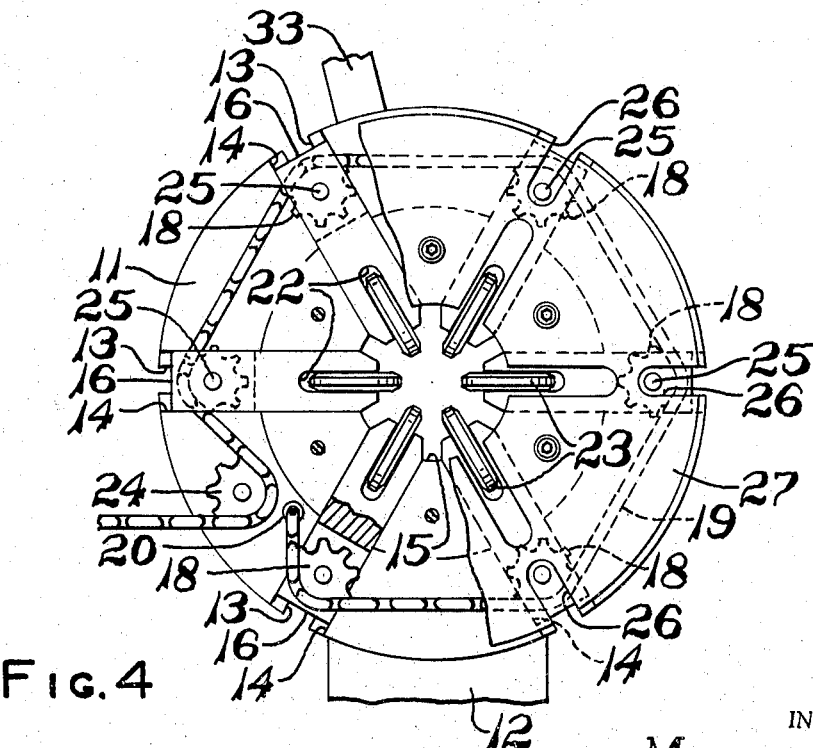
FIG. 4 is a fragmentary front elevational view of the gauging means with portions broken away to show the chain-engaging peripheral portions of the spur gears.

Referring to the drawings, there is shown in FIG. 1 a table 10 on which is secured and annular support frame 11 by a connecting frame 12 (FIG. 4). Annular support frame 11 has a plurality of circumferentially spaced radially extending recesses 13, T-shaped in cross section. The T-shaped recess has an enlarged forwardly disposed recess portion 14 which communicates with the central opening 15 of the support frame 11. Each enlarged recess portion 14 slidably receives a slide block 16, which slide block 16 has mounted on the outer bifurcated end portion thereof a spur gear 18. The respective spur gears 18 are adapted to be enlarged along their outer periphery by a chain 19, which chain 19 extends along the outer periphery of the annular support frame 11 and has its one end secured to the annular support 11 as at 20. The radial innermost end portion of each slide block 16 is slotted as at 22 to receive a roller 23 which is journalled therein for rotation. As seen in FIG. 4, a spur gear 24 is rotatably journalled closely adjacent to the securing means 20, to direct such chain 19 outwardly therefrom. The rotation of gear 24 cooperates with the chain 19 and movement of the slide blocks 16 to gauge a workpiece in a manner to be described hereinafter. Each spur gear 18 is journalled for rotation on a shaft 25 which projects laterally outwardly on both sides of the slide block 13. The one end portion of each shaft 25 is guided for radial movement in recess 26 of a face plate 27 that is secured to the annular support frame 11 (FIGS. 4 and 2). Such face plate 27 retains the slide members 17 on annular support frame 11 in their reciprocal movement.

Mounted as by a grooved bushing 30 on the rearwardly disposed face of annular support 11 is a cam disc 31 (FIG. 6) which cam disc is adapted to be rotated. Cam disc 31 has a plurality of circumferentially spaced arcuately shaped cam portions 32 which are adapted to abuttingly engage shaft 25 of slide block 16. Rotation of the cam disc 31 relative to the shaft 25 moves the respective shafts 25 and their respective slide blocks 16 inwardly or outwardly in accordance with the direction of rotation of such disc 31. Secured to cam disc 31 is a handle 33 which handle 33 has a spring bias detent 35 whose end portion is adapted to engage a serrated or notched portion 36 on the peripheral surface of the annular support frame 11 (FIG. 5). As viewed in FIG. 5, upon withdrawal of spring detent member 35 from the serrated portion 36, cam disc 31 is adapted to be rotated in a counterclockwise direction by handle 33. Each shaft 25 would be urged radially outwardly to move the respective slide blocks 16 radially outwardly to a preset position as governed by the degree of rotation of cam disc 31. Upon release of the detent member 35, the end portion thereof is adapted to engage the serrated surface 36 and thereby lock the cam disc 31 in position. The cam portions 32 limit the inward movement of the respective slide blocks 16. Such slide blocks 16 are movable radially outwardly in accordance with the dimension of hose passing through the bore 15 as determined by the exertion of pressure on the respective rollers 23. Presetting of cam disc 31 facilitates the loading of the testing apparatus at the initiation of a test run.

Figure 3:
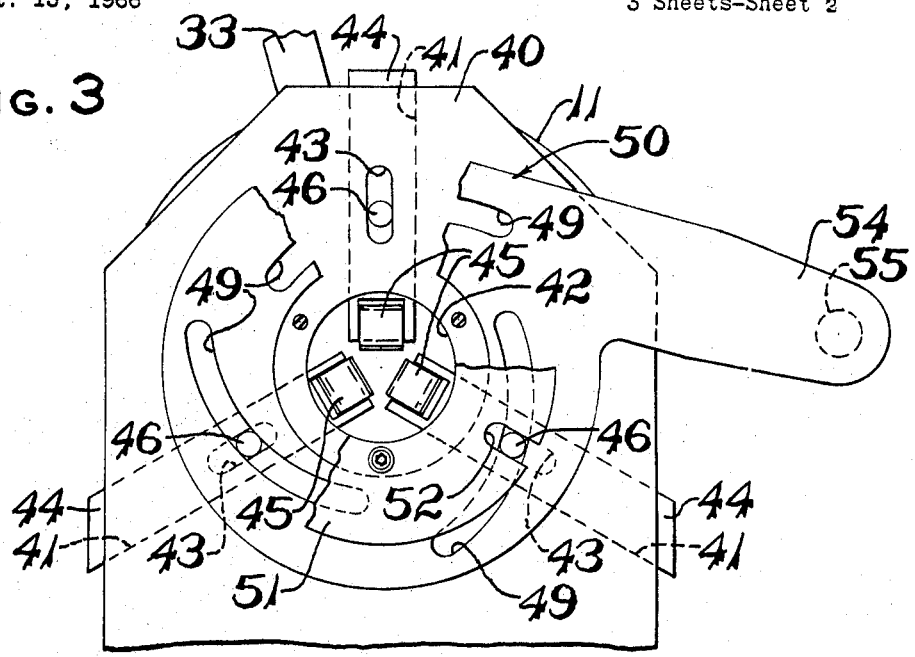
FIG. 3 is a fragmentary front elevational view of the centering means with portions broken away.

Suitably secured to the table 11 forwardly and rearwardly of the annular support frame 11 are a pair of plate members 40 (FIGS. 2 and 3). Each plate member 40 is similar in construction and therefore only one plate member 40 will be described. The one surface portion of plate member 40 has a plurality of radially extending recesses 41 which communicate with a central bore 42 that is concentric with the bore 15 of annular support frame 11. The other surface portion of plate member 40 has a plurality of oblong recesses 43 which communicate with the radially extending recesses 41 for a purpose to be described. Slidably received within the respective radially extending recesses 41 are guide blocks 44 which have guide rollers 45 rotatably journalled on the radial inward end portion thereof. Each guide block 44 has a horizontally extending pin 46 suitably secured to its intermediate portion, which pin 46 projects through the oblong slot 43 for radial movement therein. The respective guide blocks 44 are retained in the respective radial extending recess 41 by an unnumbered spacer plate (FIG. 2) secured to the plate member 40. The respective pins 46 are slidably received by cam slots 49 in an annular plate member 50, which annular plate member 50 has a central opening that is concentric with the central bore 42 in plate member 40. Such annular plate member 50 is secured for rotation thereon by a face plate 51 (FIGS. 1 and 3), which plate 51 has three radially extending slots 52 to facilitate the radial movement of the guide blocks 44 without interference to pins 46.

Each annular plate member 50 has an outwardly extending arm portion 54 which arm portions are interconnected by a rod 55 (FIG. 2) which assures simultaneous rotation of the respective annular plate members 50. Counterclockwise rotation of the annular plate members 50 as seen in FIG. 3 moves the respective pins 46 along with the slide blocks 44 radially outwardly whereas clockwise rotation of the respective annular plate members 50 move the respective pins 46 and the corresponding slide blocks 44 radially inwardly.

A bracket 56 is suitably mounted on the forwardly disposed plate member 40 as seen in FIG. 1 upon which is mounted a pneumatic control cylinder 57. A piston rod 58 of pneumatic cylinder 57 has a suitable marker 59 mounted on the end portion thereof which is adapted to engage the hose passing through the bore 42 of plate member 40 for marking upon pressurization of the head and of pneumatic cylinder 57. The back-up roller 60 is adjustably mounted on the one end portion of bracket 56 to assure marking of the hose upon extension of the piston rod 58 with the marker 59.

A bracket 62, secured to the table 10 closely adjacent to the annular support frame 11, has a vertically extending recess 63 which rotatably receives a vertically extending adjusting screw 64. Screw 64 threadedly engages a vertically movable nut 65 that is slidably guided in the recess 63. Threaded screw 64 is journalled on the bracket 62 to permit rotation thereof to adjust the vertical position of the nut 65, which nut 65 has journalled thereon a spur gear 66. Bracket 62 has a pair of spaced spur gears 67 and 68 rotatably mounted thereon which are in alignment with the spur gear 24 on annular support frame 11 whereby the chain 19 extends from spur gear 24 around spur gear 68, thence upwardly over spur gear 66 and thence downwardly for engagement with the lower end portion of spur gear 67 for connection to a pivotable arm member 70. Arm member 70 is pivotally mounted on bracket 62 as at 71 having its one end connected to a spring 72 which biases such arm member 70 in a clockwise direction as viewed in FIG. 1. Such action maintains a force on chain 19 which moves the respective slide block members 16 radially inwardly on annular support frame 11. Through adjustment of the lead screw 64 the respective slide block 16 may be adjusted to gauge hose within certain sizes. Mounted upon bracket 62 is an arcuately shaped non-conducting plate 75 which has a pair of spaced conducting block members 76 and 77 secured to its periphery. Suitable indicia are provided on such block members 76 and 77 which indicate variations from the normal preset gauged peripheral dimensions of the hose. The respective gauge blocks 76 and 77 are interconnected by conductors 78, with such block 77 connected by conductor 79 to a suitable source of power in housing 80. Arm member 70 is a conducting member which is grounded, such that contact by the outer end portion of arm member 70 with either gauge block 76 or 77 effects a closing of a switch, which in turn actuates the pneumatic cylinder 57 which in turn extends the piston outwardly as viewed in FIG. 1 such that the marker 59 contacts the hose moving through the testing apparatus and suitably marks such hose as unacceptable. Breaking of contact between the outer end portion of arm member 70 with gauge block 76 or 77 breaks the contact with the switch to deactuate the pneumatic cylinder 57 which retracts the marker 59 away from the hose passing through the testing apparatus indicating acceptability of the hose passing therethrough.

In the operation of the testing apparatus initially gauge blocks 76 and 77 are suitably located on the outer periphery of arcuate plate 75; and the length of chain 19 is adjusted through manipulation of screw 64 which presets the rollers 23 in the respective guide blocks 16 for the proper size of hose to be tested. Respective rollers 23 are set so that the chain exerts an inward pressure on the respective gauge blocks to maintain contact with a hose passing therethrough exerting and positioning the arm member 70 centrally relative to the gauge blocks 76 and 77. Any variation in the out of roundness of a hose passing through such gauging elements or rollers 23 does not effect the output of the chain 19 since the gauging element or output is the summation of the respective movements of the guide blocks 16 such that an inward movement of one guide block 16 is compensated by the outward movement of the other guide block 16. The operator then grasps the rod 55 and upon counterclockwise rotation as viewed in FIG. 1 annular plates 50 cam the respective guide blocks 44 radially outwardly through their camming action upon the respective pins 46 to move the respective guide rollers 45 radially outwardly to permit inspection of the hose therethrough for engagement by the gauging elements or rollers 23. The weight of the outermost end portions of annular plates 50, their arm members 54, and the rod 55 of annular plates 50 exerts a clockwise rotation to the annular plates 50 as viewed in FIG. 3 or FIG. 1 which in turn cams the respective guide rollers 45 radially inwardly to center the hose forwardly and rearwardly on both ends of the testing apparatus. As the hose is passed through the gauging elements, rollers 45 maintain the longitudinal center line of the hose while the gauge elements or rollers 23 respond to the respective outer periphery of the hose as they pass into engagement therewith. Such rollers 23 in turn are moved radially inwardly or outwardly which in turn effects the chain 19 which is spring biased through its connection to arm member 70. When the sum total of the different gauging elements 23 is such as to indicate a hose portion which is undersize, block element 76 will be contacted or as in the case where there is an oversized block element 77 will be contacted which in turn will energize the switch in housing 80 which in turn actuates pneumatic cylinder 57 which causes an outward movement to the piston rod 58 and marker 59 to contact the hose and mark such hose for the full length of unacceptability of the hose. Either block 76 or 77 will operate to actuate the pneumatic cylinder 57. When a hose of suitable cross section passes through the annular support frame 11 in contact with the rollers 23, the chain 19 pivots the arm member 70 to a position intermediate of the respective gauge blocks 76 and 77 which in turn breaks the contact with the switch which in turn de-actuates the pneumatic cylinder 57 to retract the marker 59 away from the hose passing through the opening 15 of the testing apparatus.

Various modifications are contemplated and may obviously be resorted to by those skilled in the art without departing from the spirit and the scope of the invention as only a preferred embodiment has been disclosed herein.

I claim:

1. An apparatus for gauging hose comprising support means, centering means mounted on said support means for guiding a hose through a bore in said support means along a longitudinal center line, said support means having a plurality of circumferentially spaced gauging elements encompassing said longitudinal center line, means interconnecting said gauging elements to provide an output signal which is the summation of all of said gauging elements, indicator means cooperative with said output signal operable to designate an oversize or undersize in the hose passing through such apparatus, each of said gauging elements including a slide block movable radially toward and away from said longitudinal center line, each of said blocks having a roller mounted on the one end portion closest to said longitudinal center line and a spur gear mounted on the other end portion thereof, said means interconnecting said gauging elements comprising a chain circumferentially encompassing said blocks and engaging said spur gears, one end of said chain secured to said support means, and the other end of said chain connected to a movable lever to provide said output signal.

2. An apparatus as set forth in claim 1 wherein biasing means are operatively connected to said lever to bias said gauging elements radially inwardly toward said longitudinal center line.

3. An apparatus as set forth in claim 2 wherein stop means are located on said support means to limit the radial inward movement of said gauging elements.

4. An apparatus as set forth in claim 3 wherein said stop means includes a plurality of cams operatively interconnected to limit the radial inward movement of said slide blocks, and adjusting means operatively interconnecting said stop means to said support means to vary the position of said cams and thereby adjust the limit of inward movement of said slide blocks.

5. An apparatus for measuring continuously the periphery of a moving tubular hose whose cross sections are not necessarily regular or circular to determine their acceptability for the conveyance of fluids therethrough comprising support means, said support means having a bore therethrough having a longitudinal center line, sensing means on said support means for measuring the periphery of a hose passing through said bore, indicia means on said support means, output means operatively connected to said sensing means for registering the peripheral dimensions of hose passing through said bore on said indicia means, sensing means comprising a plurality of gauging elements movable radially toward and away from said longitudinal center line, centering means mounted on opposite sides of said support means, said centering means having rollers on their end portions adjacent to said center line, and cam means operatively connected to said centering means for biasing said rollers toward said longitudinal center line.

6. An apparatus as set forth in claim 5 wherein said gauging elements include a plurality of slide blocks movable radially toward and away from said longitudinal center line, each of said blocks having a roller mounted on the one end portion closest to said longitudinal center line and a spur gear mounted on the other end portion thereof, said output means including a chain circumferentially encompassing said blocks and engaging said spur gears, one end of said chain secured to said support means and the other end of said chain connected to a movable lever operable over the range of said indicia, and biasing means operatively connected to said lever to bias said gauging elements radially inwardly toward said longitudinal center line.

7. An apparatus as set forth in claim 5 wherein said indicia means includes an arcuately shaped disc, a pair of spaced contacts adjustably mounted on said disc, a pneumatic cylinder mounted on said support having a piston rod extending along a line toward said longitudinal center line, a marker on the end portion of said piston rod, and said lever operative upon engagement with either of said contacts to energize said pneumatic cylinder to pressurize the one end thereof to move said marker toward said center line to mark hose passing through said bore during energization of said pneumatic cylinder.

8. An apparatus as set forth in claim 5 wherein said indicia means includes an arcuately shaped disc, a pair of spaced contacts adjustably mounted on said disc, signal means mounted on said support means, and said lever operative upon engagement with either of said contacts to energize said signal means to designate a size out of a preselected range of peripheral sizes.

9. An apparatus for the continuous measuring of the periphery of a moving tubular hose whose cross sections are not necessarily regular or circular to determine their acceptability for the conveyance of fluid therethrough, comprising support means having a central bore therethrough, guide means mounted adjacent thereto to guide a hose along a longitudinal center pass line of said bore, a plurality of circumferentially spaced blocks moved radially inwardly and outwardly from said pass line, each slide block having a roller mounted on one end portion thereof which end portion is closely adjacent to said pass line, each of said slide blocks having a spur gear mounted on the other end portion thereof, a chain engaging peripheral portion of the spur gear, said chain having one end attached to said support means and the other end extending outwardly therefrom whereby such linear movement of such other end portion operates to move such slide blocks radially inwardly and outwardly toward said pass line, said other end portion of said chain being connected to a lever arm pivoted to said support means, indicator means mounted on said support means operative to register movement of one end of said lever arm, spaced contacts mounted on said indicator means, a pneumatic cylinder mounted on said support means, said cylinders having a piston rod extending radially toward said pass line, said piston rod having a marker thereon, said contacts operative upon engagement of said lever arm with either of said spaced contacts to actuate said pneumatic cylinder to extend said piston rod and said marker toward said pass line, and means to adjust the position of said rollers and said slide blocks without effecting the movement of said lever arm between said spaced contacts.

References Cited
UNITED STATES PATENTS

| | | |
|---|---|---|
| 1,576,346 | 3/1926 | Mendell. |
| 2,177,051 | 10/1939 | Birmingham. |
| 2,519,221 | 8/1950 | Bogen et al. |
| 2,642,664 | 6/1953 | Wilson et al. |
| 2,721,317 | 10/1955 | O'Neill. |
| 2,895,373 | 7/1959 | Eyraud. |
| 3,264,631 | 8/1966 | Ege. |

SAMUEL S. MATTHEWS, Primary Examiner

U.S. Cl. X.R.

33—178